May 5, 1925.                                                        1,536,556
G. A. BECKWITH
TIRE CHAIN
Filed Sept. 15, 1923

G. A. Beckwith, Inventor

By C. A. Snow & Co.

Attorney

Patented May 5, 1925.

1,536,556

UNITED STATES PATENT OFFICE.

GILES A. BECKWITH, OF WATERFORD, CONNECTICUT.

TIRE CHAIN.

Application filed September 15, 1923. Serial No. 662,931.

*To all whom it may concern:*

Be it known that I, GILES A. BECKWITH, a citizen of the United States, residing at Waterford, in the county of New London and State of Connecticut, have invented a new and useful Tire Chain, of which the following is a specification.

By way of explanation it may be stated that the chains of an anti-skid device often need replacing, and one object of the invention is to provide novel means whereby the cross chains may be replaced, as aforesaid, readily. Another object of the invention is so to construct the cross chain that the same will resist wear.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
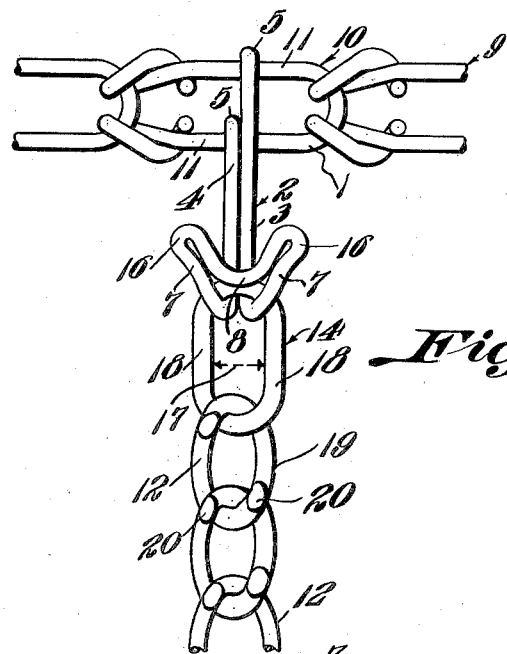
Figure 2:
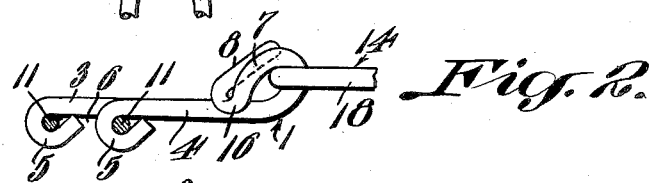
Figure 3:
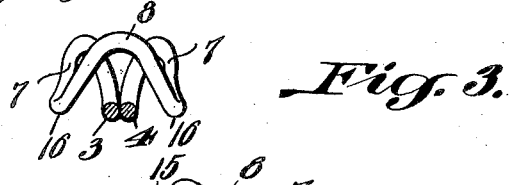
Figure 4:
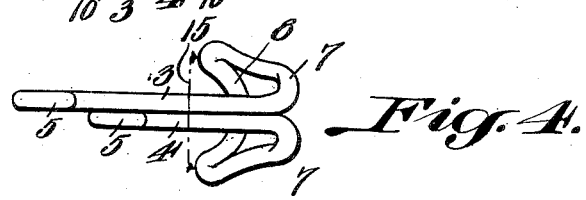
Figure 5:

Figure 1 shows in plan, a device constructed in accordance with the invention; Figure 2 is an elevation of the connector, parts appearing in section; Figure 3 is a cross section taken through the connector; Figure 4 is a bottom plan of the connector; and Figure 5 is a cross section taken through one of the links of the transverse chain.

The device forming the subject matter of this application comprises a connector 1 including a shank 2 made up of arms 3 and 4 of different lengths, the arms being provided with eyes 5 which are spaced apart longitudinally of the shank 2, the arms 3 and 4 merging into diverging hooks 7 which are inclined toward the shank, the hooks being united by an integral U-shaped connection 8 located between the hooks and extending in a direction opposite to that in which the hooks extend.

The device includes a side chain 9 comprising a link 10 including side members 11 each eye 5 being engaged about one side member 11.

The numeral 12 denotes a cross chain embodying a link 14 wherewith the hooks 7 are engaged, the space 15 between the ends 16 of the hooks 7 being greater than the distance 17 between the sides 18 of the link 14. It will be obvious that when the link 14 is disposed approximately at right angles to the shank 2, the said link may be engaged with the hooks 7 and when the link 14 is disposed in alinement with the shank 2, an accidental disengagement of the link 14 will be practically impossible. It will be understood that one end of the cross chain 12, only is shown, the other end of the cross chain being connected with the corresponding side chain after the manner hereinbefore described, and through the instrumentality of a connector such as the element 1.

It is a matter of common knowledge that diagonally opposite points of the links of the cross chain wear away, and with a view to resisting such wear, certain links 19 of the cross chain 12 are provided with diagonally opposite projections 20 extending in a direction substantially at right angles to the ground-engaging surface of the link 19.

What is claimed is:—

1. In a device of the class described, a connector comprising arms defining a shank, the arms merging into diverging hooks which are inclined toward the shank, the hooks being united by an integral U-shaped connection located between the hooks and extending in a direction opposite to that in which the hooks extend, a side chain wherewith the shank is engaged, and a cross chain embodying a link wherewith the hooks are engaged, the space between the ends of the hooks being greater than the distance between the sides of the last specified link.

2. A chain for anti-skidding devices, the chain being made up of interengaged loop-shaped links, each link being provided at diagonally opposite points with projections which extend substantially at right angles to the ground-engaging surface of the link, each projection of each link being located substantially at the place where each link is crossed by a concatenated link.

In testimony that I claim the foregoing as my own, I have hereto affixed my signature in the presence of two witnesses.

GILES A. BECKWITH.

Witnesses:
FRED S. GOULD,
EDMUND B. REID.